Jan. 22, 1963   P. GILLE ETAL   3,074,628
MOTION CONTROL ARRANGEMENT FOR A BUSINESS MACHINE
Filed Feb. 21, 1961   14 Sheets-Sheet 1

INVENTORS
Paul Gille
Bernhard Mettich
Walter Lorenz
Heinz Scherner
BY
Michael S. Striker
attorney Jan. 22, 1963   P. GILLE ETAL   3,074,628
MOTION CONTROL ARRANGEMENT FOR A BUSINESS MACHINE
Filed Feb. 21, 1961   14 Sheets-Sheet 2
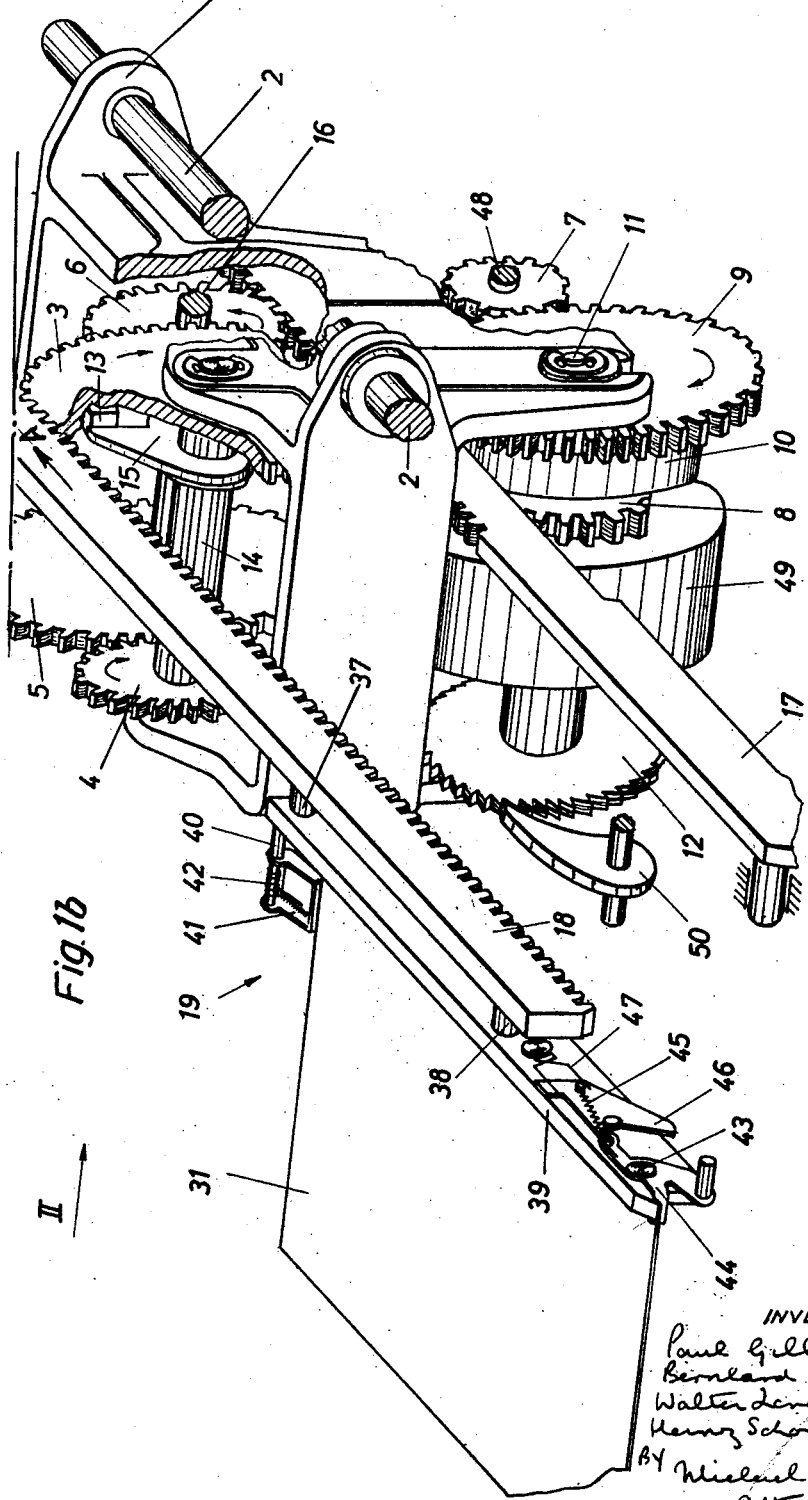
INVENTORS
Paul Gille
Bernhard Hettich
Walter Lorenz
Henry Schorner
BY Michael S. Striker
Attorney Jan. 22, 1963   P. GILLE ETAL   3,074,628
MOTION CONTROL ARRANGEMENT FOR A BUSINESS MACHINE
Filed Feb. 21, 1961   14 Sheets-Sheet 3

INVENTORS
Paul Gille
Bernhard Hettich
Walter Lorenz
Heinz Schorner
By Michael S. Striker
Attorney

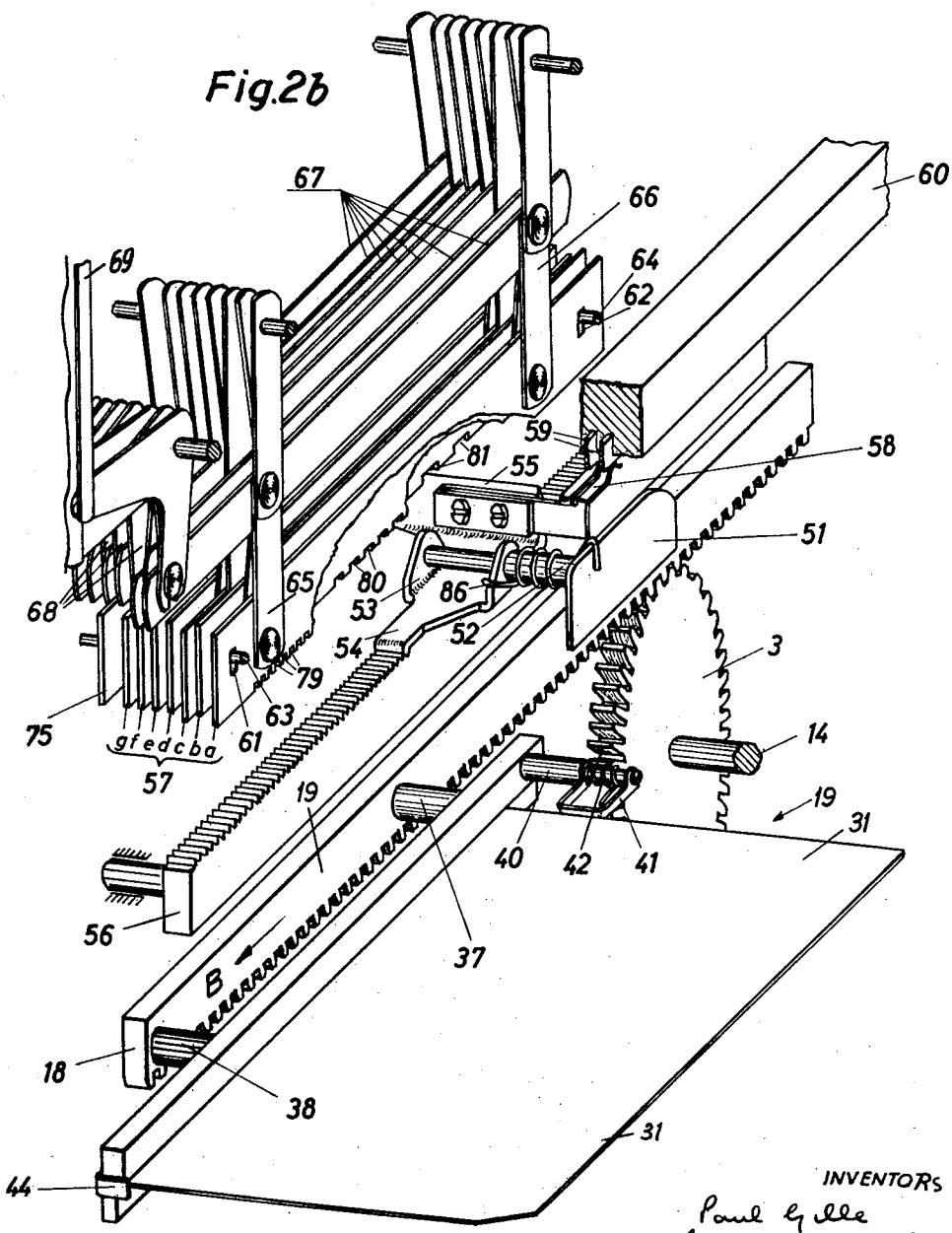

Jan. 22, 1963 P. GILLE ETAL 3,074,628
MOTION CONTROL ARRANGEMENT FOR A BUSINESS MACHINE
Filed Feb. 21, 1961 14 Sheets-Sheet 5

INVENTORS
Paul Gille
Bernhard Hettich
Walter Lorenz
Heinz Scherner
BY Michael S. Striker
Attorney

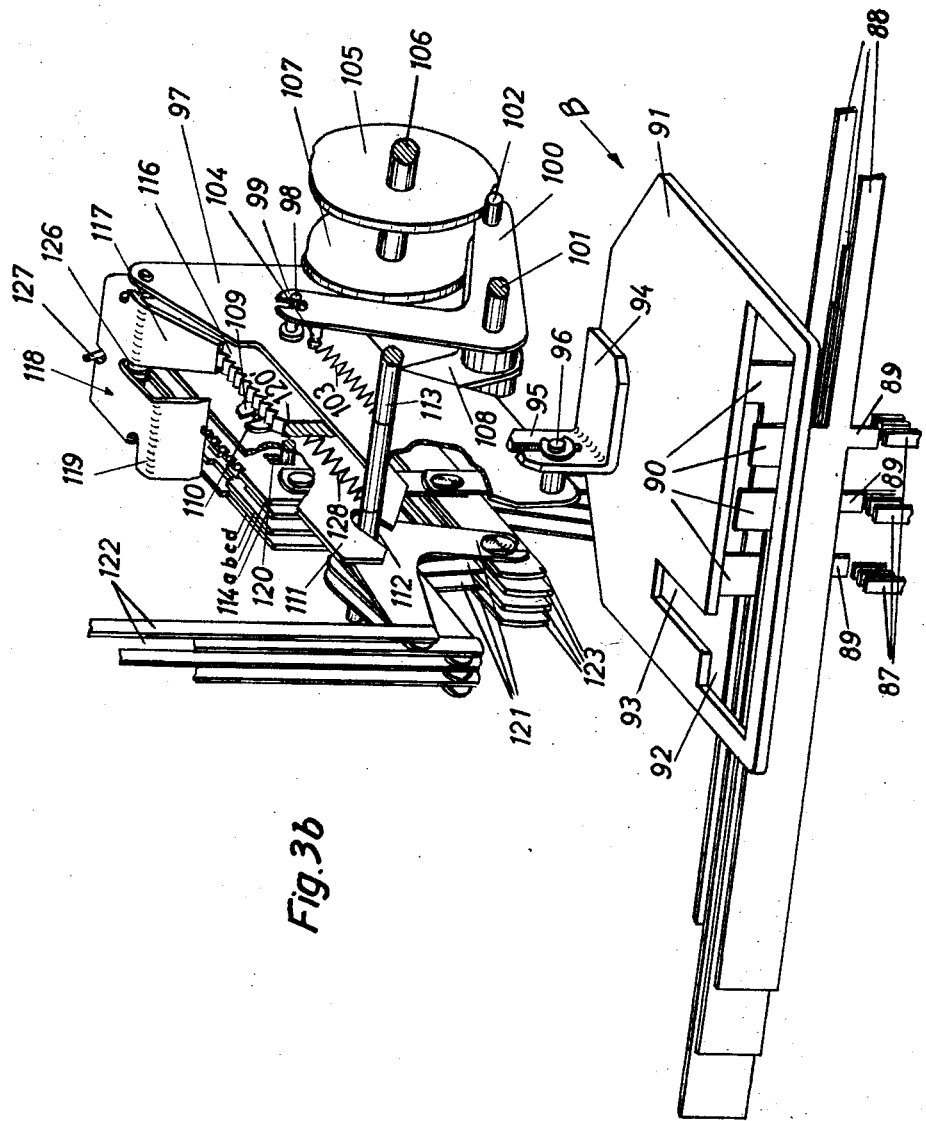

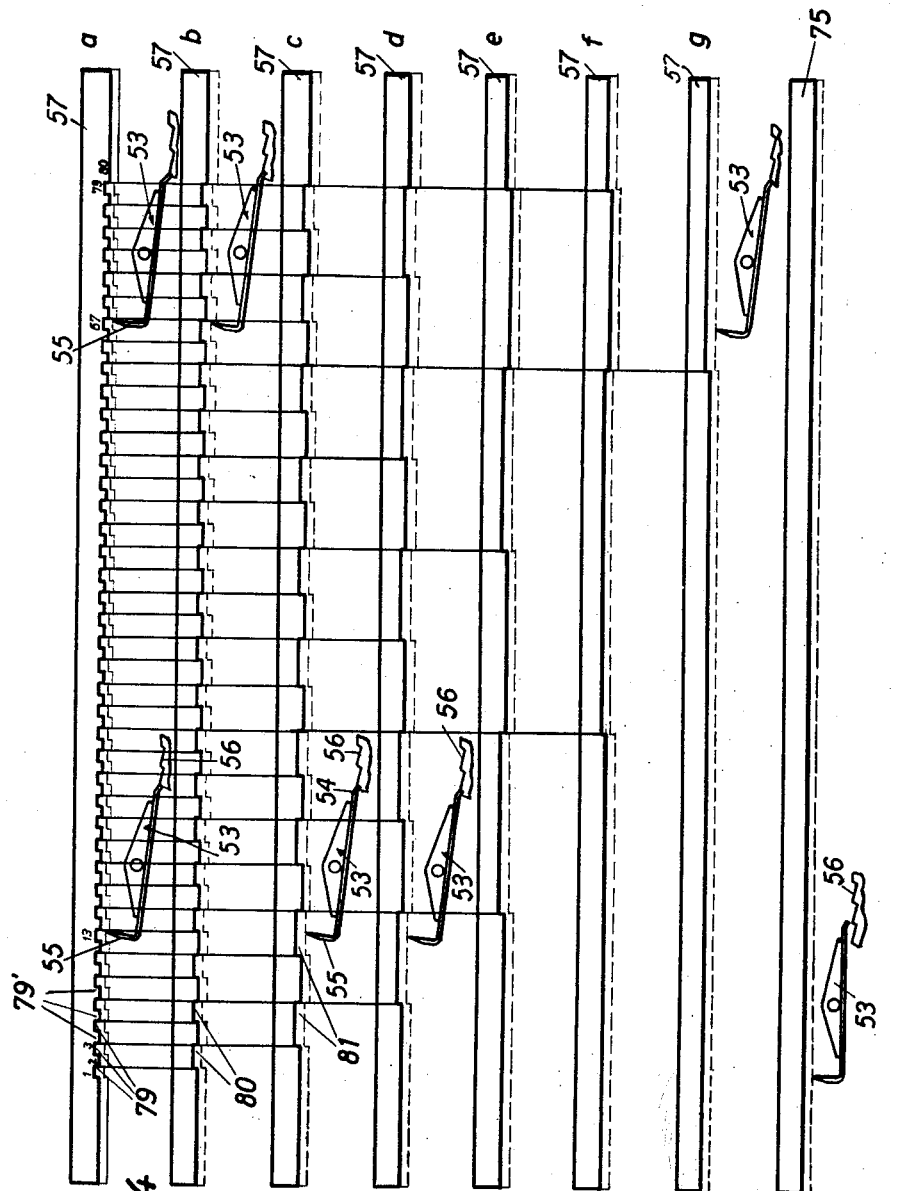

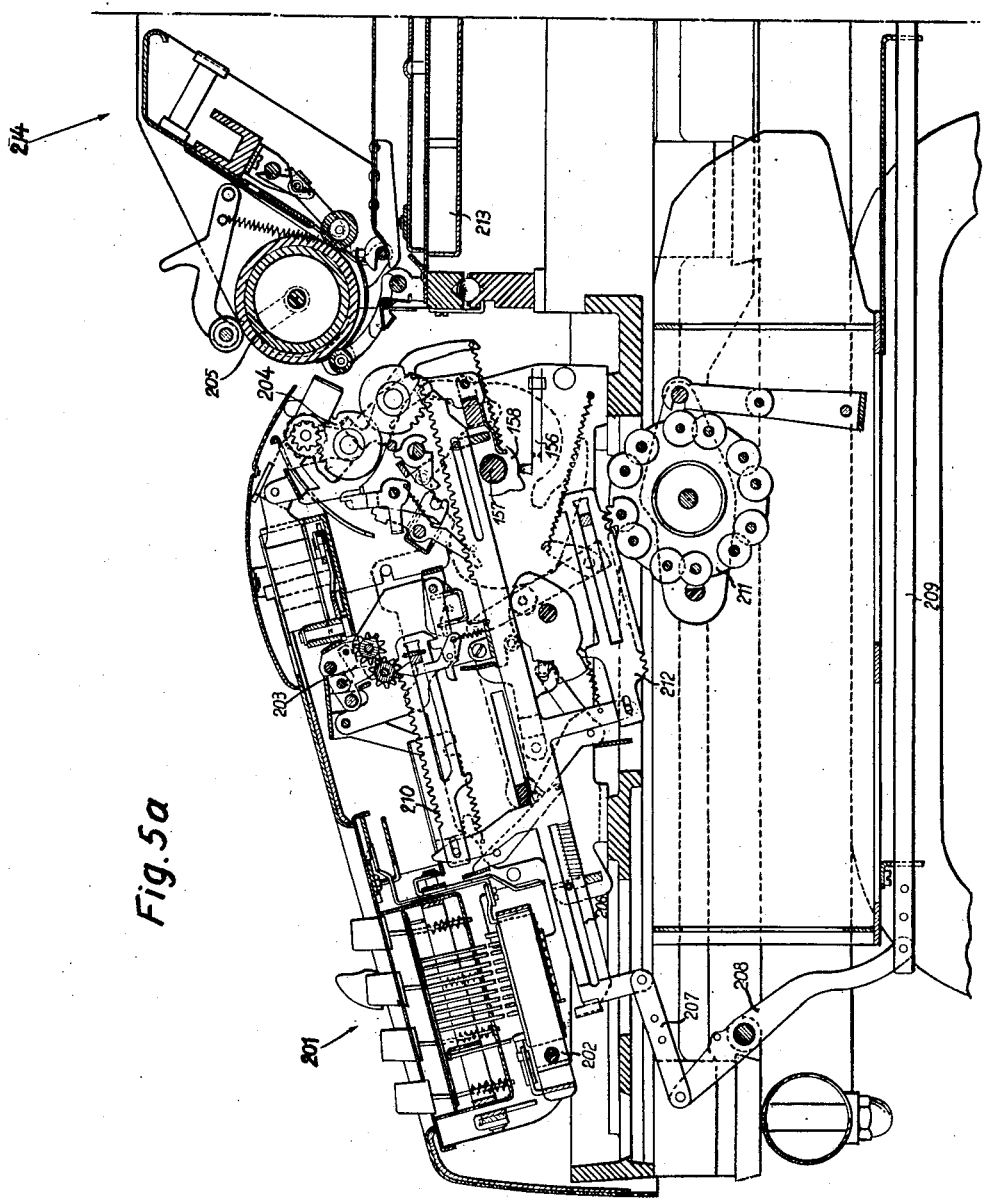

Fig.5b

Jan. 22, 1963                P. GILLE ETAL                3,074,628
              MOTION CONTROL ARRANGEMENT FOR A BUSINESS MACHINE
Filed Feb. 21, 1961                                 14 Sheets-Sheet 10

INVENTORS
Paul Gille
Bernard Hettich
Walter Lorenz
Heinz Schermer
BY Michael S. Striker
        Attorney

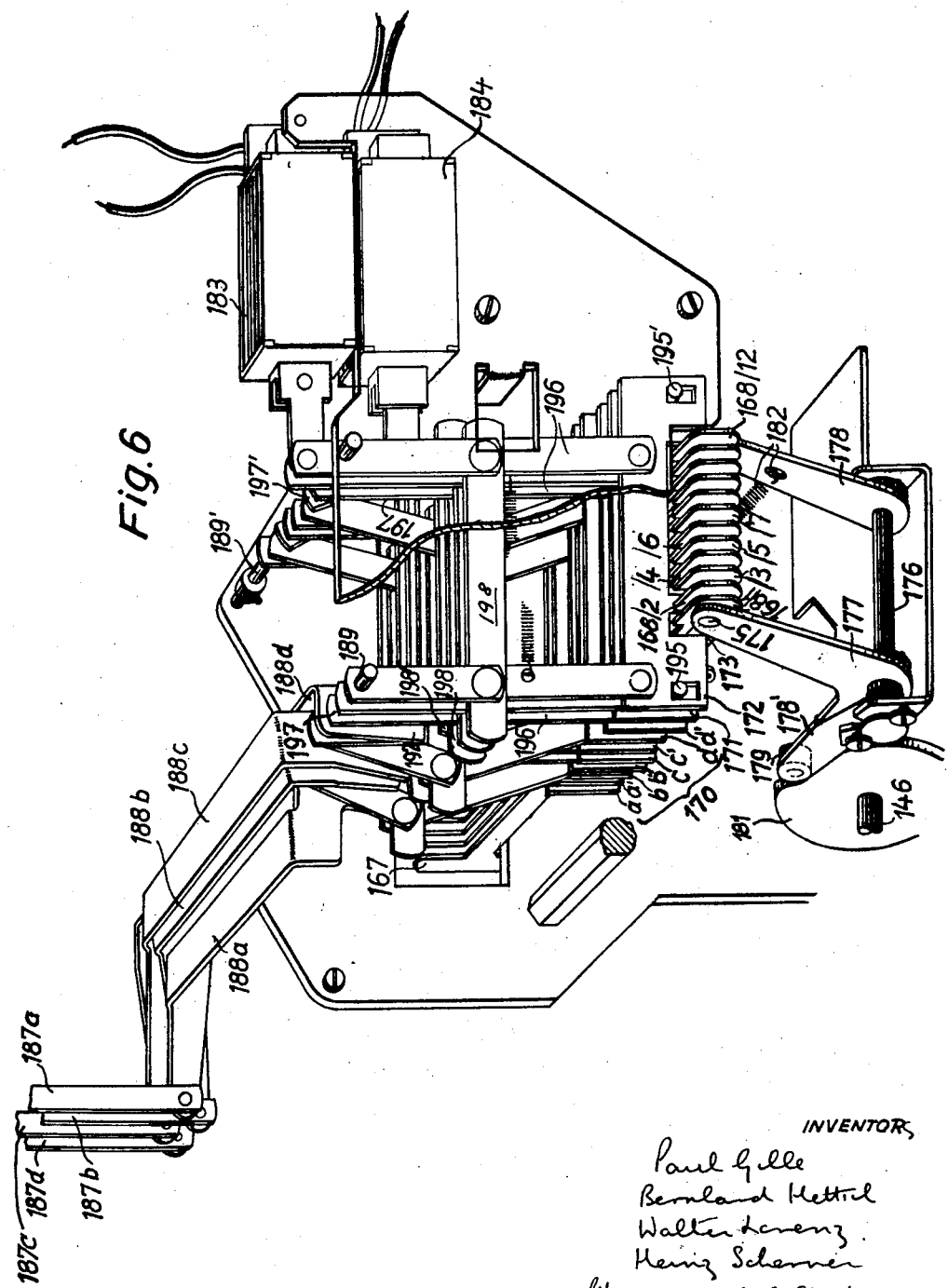

Jan. 22, 1963  P. GILLE ETAL  3,074,628
MOTION CONTROL ARRANGEMENT FOR A BUSINESS MACHINE
Filed Feb. 21, 1961  14 Sheets-Sheet 14

INVENTORS.
Paul Gille
Bernhard Hettich
Walter Lorenz
Heinz Scherner
BY Michael S. Striker
attorney United States Patent Office 3,074,628
Patented Jan. 22, 1963

3,074,628
MOTION CONTROL ARRANGEMENT FOR A
BUSINESS MACHINE
Paul Gille, Bernhard Hettich, Walter Lorenz, and Heinz Schörner, Villingen, Black Forest, Germany, assignors to Kienzle Apparate G.m.b.H., Villingen, Black Forest, Germany
Filed Feb. 21, 1961, Ser. No. 104,767
Claims priority, application Germany Feb. 22, 1960
21 Claims. (Cl. 235—60.47)

The present invention relates to a motion control arrangement for a business machine, and more particularly to apparatus for controlling the motions of a record carrying card, of a means controlling the marking or punching of the card, and of the means by which extra holes are punched into the card so that all marking operation on the card are performed in accordance with a program which is preferably determined by setting tabs on a program carriage of the machine. In an accounting machine, which includes a paper or bookkeeping carriage, the program carriage is connected to the bookkeeping carriage for movement so that the calculating operations and the printing of the results on the record carrier sheet on the bookkeeping carriage, are carried out in synchronism with the punching of a card.

In known accounting machines, punching means are provided for punching in a record card holes representing the values calculated by the accounting machine, or entered into a ledger sheet by the accounting machine, or vice versa. This requires a stepwise movement of the card corresponding to the stepwise movements of the bookkeeping carriage of the accounting machine to the respective columns of the record carrying sheet on the bookkeeping carriage. If punch cards are used which have a hole distribution according to the column, the different width of the hole areas have to be considered during the punching and sensing operations, so that a superimposing of holes is prevented. For example, in an area which includes five columns, no more than five columns must be punched.

The known devices serving this purpose are very complicated and have the disadvantage that the program must be changed in the punching apparatus whenever a different accounting program is set on the machine. Program control means for the punching operation forms part of the punching apparatus in the prior art, and requires a complete exchange of parts when a new program is intended.

For example, a control drum may have to be removed and replaced, which cannot be carried out by the accountant which operates the accounting machine, but requires the assistance of a mechanic.

Another known construction for this purpose employs a program card, which is placed in the punching apparatus and sensed by suitable feelers. In this construction, it is only necessary to exchange the program card when the program is changed. However, even this operation requires a great deal of time for any change of the program.

In the known art, not only the motion of the card, but also the connection of the operative punches is carried out with the above explained apparatus, and consequently have the same disadvantages.

If the program has to be changed in one of the known machines, in addition to setting of the program on the program carriage of the accounting machine, two other program means have to be exchanged so that the punching mechanism is properly operated corresponding to the new program.

It is one object of the present invention to eliminate disadvantages of the prior art constructions, and to provide a motion control arrangement in which the program is set for the accounting machine, for the motion of the punch card, for the selection of punches, and for all other related operations by means provided in the region of the bookkeeping carriage.

Another object of the present invention is to provide on an accounting machine, program means of very simple construction which can be set to a new program by an unskilled operator.

Another object of the present invention is to provide an accounting machine with a program carriage on which tabs can be set to control all devices which have to be operated in accordance with a new program.

Another object of the present invention is to provide a set of control members controlling the motion of controlled means, and to provide the control members with correlated projections and recesses which are simultaneously sensed by means which influence the motions of the controlled means.

With these objects in view, the present invention relates to a business machine which comprises a movable bookkeeping carriage on which numbers introduced into and calculated in the accounting machine are printed in columns of a record carrying sheet; controlled means for example transporting means for a punch card, or a slide controlling punching operation, a set of control members, preferably parallel control bars, formed with projections and recesses, program means connected to the bookkeeping carriage for movement therewith and preferably including tabs on a program carriage, means for connecting the program means with the control members for moving selected control members to an effective position, and means for sensing projections and recesses of the control members in the effective position. The last-mentioned means are operatively connected to the controlled means to control the movement of the same according to sensed projections and recesses of the control members. In this manner, the controlled means stop in selected positions under control of the program means.

Another aspect of the present invention is the construction and arrangement of the projections and recesses of the control members. In one embodiment of the invention, the control members have projections and recesses extending through different distances and being constructed and arranged in such a manner that a projection or a recess of each control member has the same length as a projection and a recess of another control member. The number of projections and recesses of each control member is different, the different numbers being successive powers of two. The projections and recesses of each control member are of the same length, and preferably the lengths of the projections and recesses of adjacent control members are in the ratio of 1:2:4:8 and so forth.

The beginning of the first recess of the second control member is aligned with the end of the first recess of the first control member, the beginning of the first recess of the third control member is aligned with the end of the first recess of the second control member and the same principle is applied to any number of control members provided, aligned projections and recesses of all the control members being simultaneously sensed by sensing means which preferably control arresting means by which the motion of the controlled means is controlled.

In the preferred embodiment of the invention, a movable program carriage is connected to the bookkeeping carriage and moves with the same. A set of tabs is set on the program carriage, the tabs being respectively correlated with the control members. A set of linkage means including sensing elements engaged by the tabs during movement of the program carriage, is connected to the control members, respectively for moving the same to the effective position in which they can be sensed by feeler means. In one embodiment of the invention, the control members extend in the direction in which the controlled means moves. In another construction of the invention, the control members extend transverse to the direction in which the controlled means moves, and this arrangement is advantageously used for controlling the motion of punch hammers which determine the place of extra holes representing plus, minus or a sum, on the punched card.

The apparatus according to the prior art for punching extra holes in punched cards, did not permit a column selection, but the extra hole had to be punched on a predetermined place. This is a disadvantage, if an accounting machine with a punching apparatus has to be used in an existing punch card system because an adaptation of the apparatus to the existent conditions and operations is required. It may be that in the same organization, different extra hole controls are needed, for example that in one accounting program the extra hole has to be punched at the first decimal order, and in another accounting program the extra hole has to be punched at the second or third decimal order of the respective column. In order to be able to use an accounting machine with a punching apparatus for all kinds of systems, it has been necessary to adapt all accounting programs to the same system of extra holes.

The present invention provides a set of control bars extending transverse to the controlled punch hammers for the extra holes and controlling the movement of the same in such a manner that the plus or minus extra hole can be placed at any desired line of the respective line, while the program is set on the program carriage of the accounting machine, that is on the same place where the program for the other operations of the accounting machine are set.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 5B:
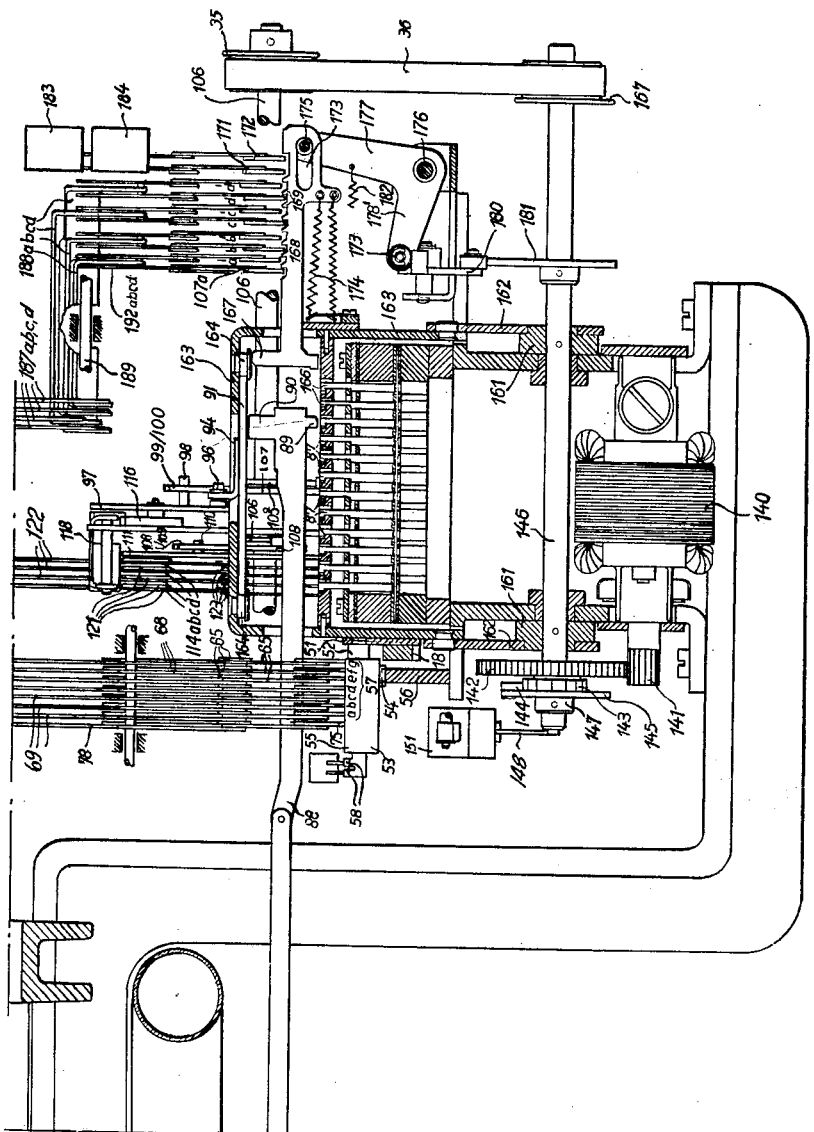
Figure 7:
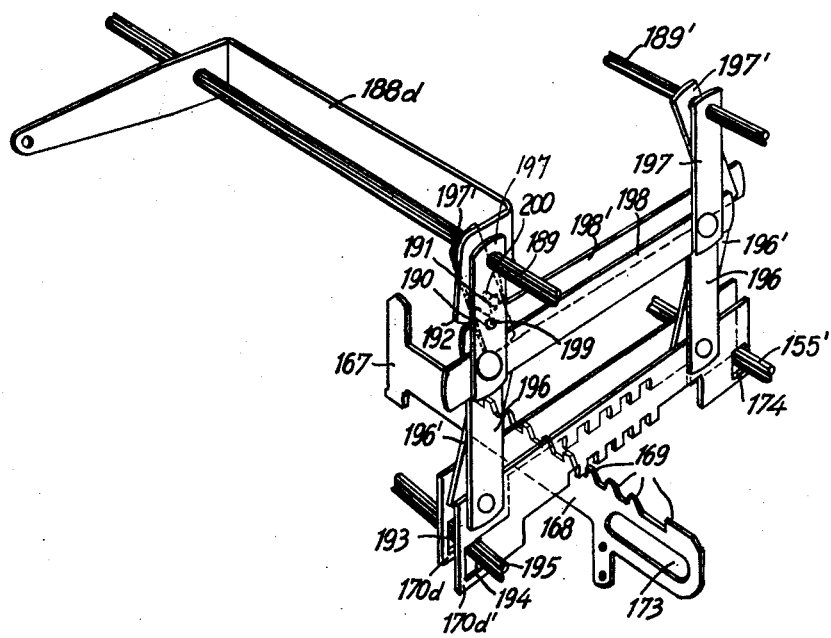
Figure 8:
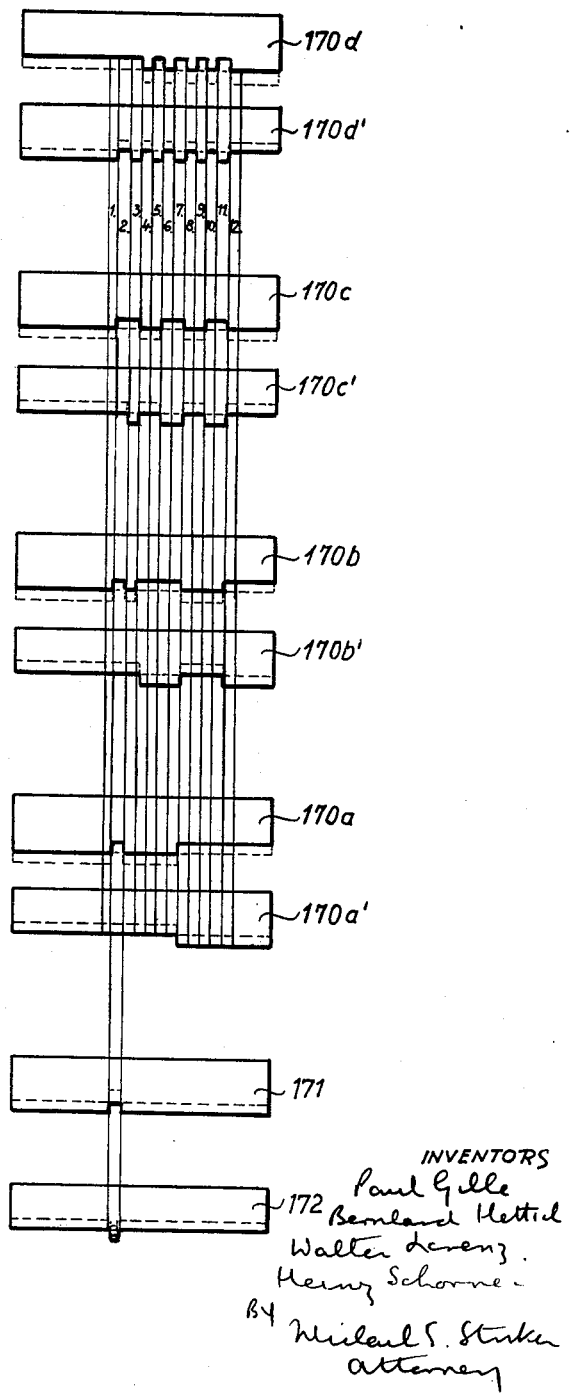
Figure 10:
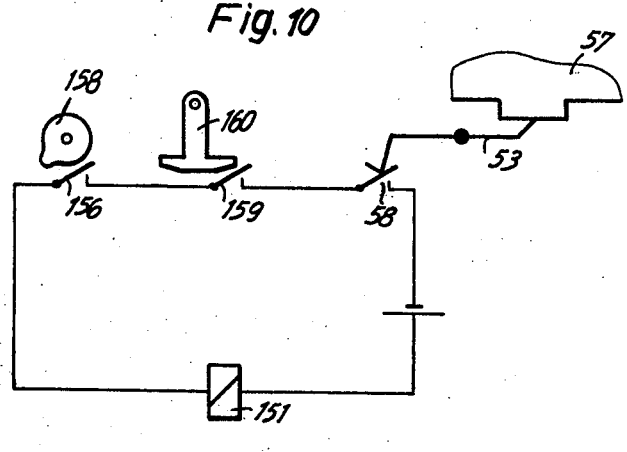
Figure 9:
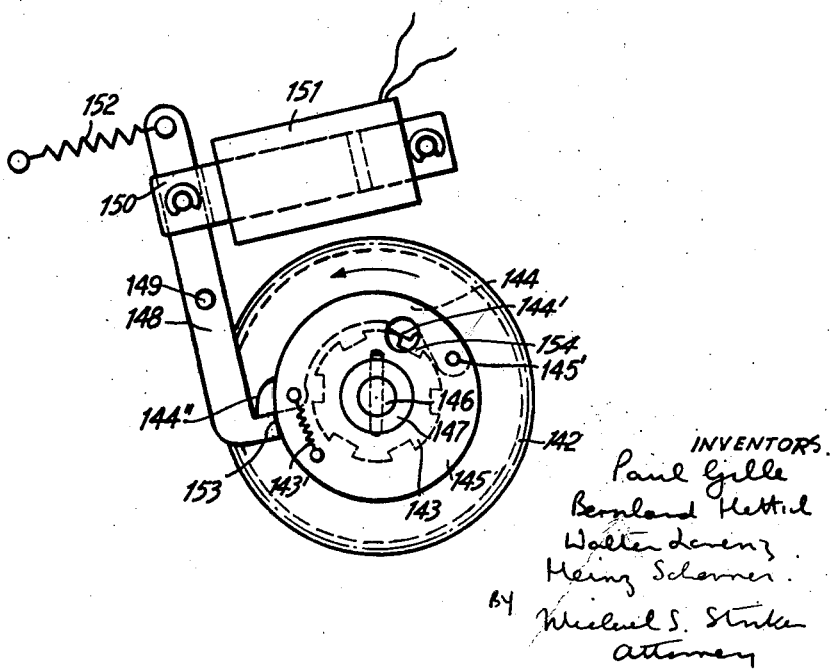

FIG. 4 consists of side views of seven control members and a clearing member and shows the arrangement of projections and recesses on the control members which are simultaneously sensed by a feeler means;

FIG. 5 includes two separated upper portions FIG. 5a and FIG. 5b and a separated lower portion FIG. 5b'. FIG. 5 is a cross-sectional view of an accounting machine with a punching device and incorporating the apparatus of the present invention;

FIG. 6 is a fragmentary perspective view illustrating a motion control arrangement according to the present invention for controlling the punching of extra holes in cards;

FIG. 7 is a fragmentary perspective view illustrating a constructive detail of the motion control arrangement shown in FIG. 6;

FIG. 8 consists of a series of side elevations illustrating pairs of control members used in the motion control arrangement of FIG. 6;

FIG. 9 is a side view illustrating a one-revolution coupling used in the part of the accounting machine shown in FIG. 5b; and FIG. 10 is a diagrammatic view illustrating the circuit of an electromagnetic operating means for the coupling shown in FIG. 9.

Referring now to the drawings, and more particularly to FIGS. 5a and 5b which illustrate a known accounting machine provided with the novel motion control arrangements of the present invention, a keyboard 201 controls a pin carriage 202 whose pins are sensed by the rack member 206 which is connected by a lever linkage 207, 208, 209 with the punch control bar 88. A totalizer 203 is operatively connected with the rack bar member 206 through the rack bar 210, and storage counters 211 are set by the rack bar 212 which is also connected to the rack bar member 206. A bookkeeping carriage 214 supports a record carrying sheet on the paper platen 205 on which the printing means 204 print in column selected by set in control tabs on the control bridge 213 of the bookkeeping carriage 214. This arrangement is known, and not an object of the present invention.

FIG. 5b illustrates the motion control arrangements of the present invention by which the card transporting means, the selection of the punches, and the proper placing of the extra holes are controlled.

A mian drive motor 140 drives through a pinion 141, a gear 142 which is connected to a notched wheel 143 which is part of a one-revolution coupling shown in detail in FIG. 9. The notched wheel 143 drives through a coupling member 144 which is rockably mounted by means of a pin 145' on a disc 145, the shaft 146 which drives a pulley 167 which is connected by a belt 36 to another pulley 35 on a shaft 106 so that shaft 106 is driven when the one-revolution coupling is in coupling position.

The coupling member 144 has a coupling projection 144' and a projection 144" projecting beyond the peripheral surfaces of the disc 145. Coupling member 144 is spring-loaded in counterclockwise direction by a spring 143', which is secured to the disc 145, so that coupling member 144 will rock in a coupling position as soon as its projection 144" will be released by lever 148. Disc 145 is secured to a bushing 147 which is connected by a pin to shaft 146. The coupling member 144 is effective together with a control lever 148 mounted on a shaft 149 and being connected to the movable armature 150 of electromagnetic means 151. Lever 148 is also connected to a spring 152 which urges the transverse projection 153 on the end of lever 148 against the peripheral surface of disc 145.

Where the electromagnetic means 151 is energized, so that lever 148 turns about fulcrum 149 in clockwise direction, the projection 153 releases the coupling member 144, and the projection 144' engages a notch 154 of the notched wheel 143 so that the notched wheel 143, and motor 140, are positively connected to disc 145 and shaft 146. It will be noted that during each cycle of operation of the machine, the electromagnetic means 151 will be energized only for a short moment, so that the projection 144" of the coupling member 144 will be stopped by the transverse projection 153 of lever 148, after having made one complete revolution. While the coupling member 144 is blocked against rotation in counterclockwise direction, the notched wheel 143 continues to rotate and so that the projection 144' is urged to leave the notched wheel 143.

The notched wheel 143 is already rotated by motor 140 when the electromagnetic means 151 is energized. Electromagnetic means 151 is controlled by the circuit shown in FIG. 10 from which it is apparent that three switches in series with the winding of electromagnetic means 151. All switches are normally open, and switch 156 is closed by cam 158, also shown in FIG. 5a, which is rotated by the main shaft of the machine so that switch 156 is closed at the proper moment of the cycle of the machine. Switch 159 is controlled by a tab 160 on the program control bridge 73, see FIG. 5b, so that the switch 159 is closed when the bookkeeping carriage 214 to which the program carriage 72 is connected for movement, is in a desired column position. Switch 58 is also shown in FIG. 5b and in FIG. 2, and is operated by feeler 53 which senses control members 57, as will be explained hereinafter in detail with reference to FIG. 2. Consequently, the one-revolution coupling will only be coupled, and effect rotation of shaft 106 when control members 57 are in an effective position, which is also determined by tabs on the program carriage 72. While switches 58 and 159 are closed at the same time under control of tabs on the program carriage 72, switch 156 is closed only during a cycle of the machine requiring a punching operation, and after motor 140 is already running. Motor 140 is energized at the same time as the main drive motor by which shaft 157 of cam 158 is driven.

Shaft 146 carries two fixed eccentric members 161 on which two connecting rods 162 are mounted. The ends of connecting rods 162 are articulated to the arms of a U-shaped bridge member 163 so that the same moves up and down in a reciprocating stroke. A punch controlling slide 91 is mounted on the yoke of bridge member 163 for horizontal movement between a pair of guide rollers 164. The punch hammer heads 90 are located between the punch controlling slide 91, and one of the punches 87, the position of the actuating projection 89 being determined by the position of the punch controlling bar 88 which depends on the position of the rack bar member 206 by which the pin carriage 202 is sensed. This arrangement is known, and not an object of the present invention.

A rack bar 18 is shown in FIG. 5b and in FIG. 2b, and carries a card transporting slide 19, which will be described with reference to FIGS. 1 and 2 by which a card 31 is transported underneath the punches 87. The number of actuated punches is determined by the position of the punch controlling slide 91 since the same may be located over a single hammer head 90, or over several hammer heads 90, each of which will have a position determined by the pin carriage. In this manner, a desired and selected number of orders can be punched in the punched card as the same is moved step by step to place successive columns underneath the rows of punches.

In accordance with the present invention, the stepwise movement of the card is controlled by control tabs 71 on the program carriage 72, and the novel apparatus of the present invention by which this control is obtained, will now be described with reference to FIGS. 1, 2 and 4.

Figure 1A:
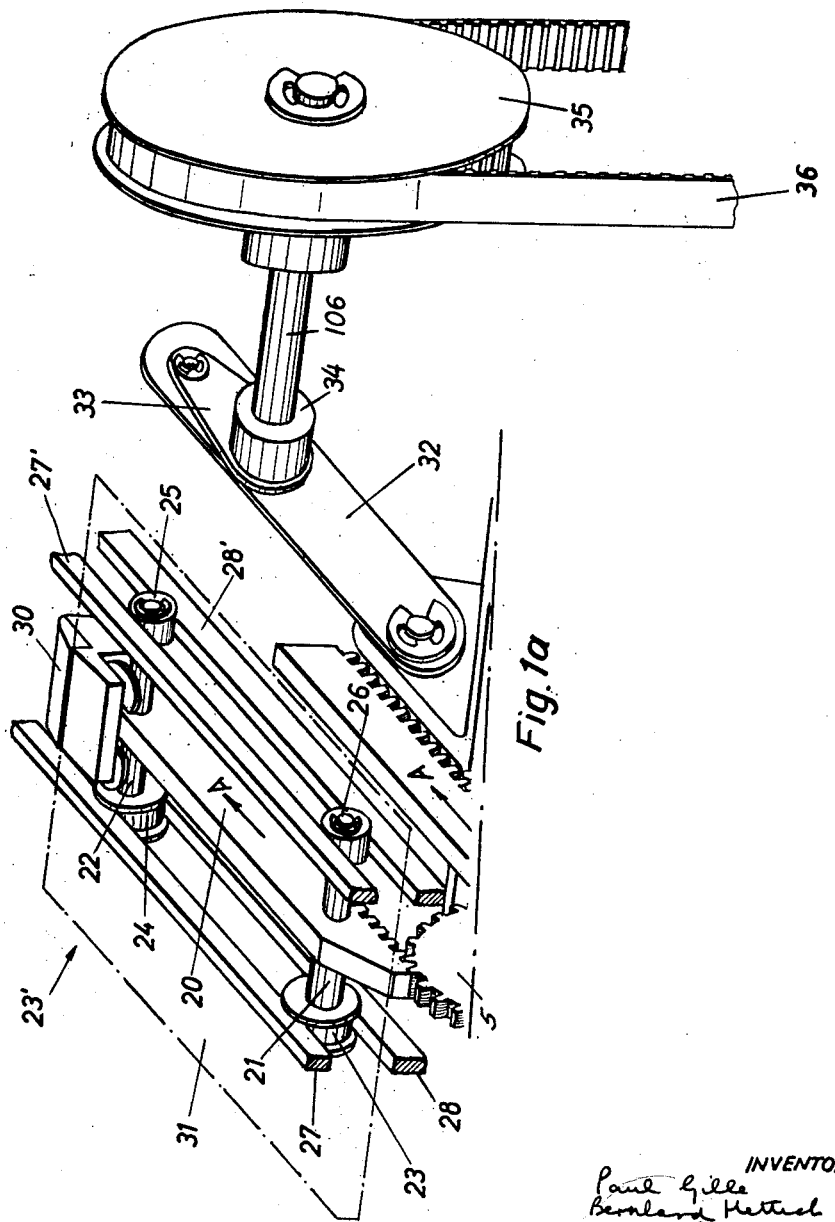
FIG. 1 is a fragmentary perspective view illustrating the card transporting mechanism and includes two separated portions FIG. 1a and FIG. 1b.

Referring first to FIG. 1, the shaft 34 driven by pulley 35 is fixed to the sleeve of an arm 33 which drives an articulated link 32 connected to a slide 1 which is guided on a guide shaft 2 and on another corresponding guide shaft, not shown. During rotation of arm 32, slide 1 will reciprocate along guide shaft 2. Slide 1 carries a gear train including the gears 3, 4, 5, 6 and 7 and another gear, not shown, which meshes with gear 8. Gear 9 is a gear crown on the housing of a spring motor 10 which is mounted on shaft 11 and connected by a spring with shaft 11. The locking ratchet wheel 12 is fixed to shaft 11, and cooperates with a ratchet pawl 50.

Gear 3 has a transverse axially projecting stop 13 which cooperates with an arm 15 fixed to shaft 14. Gear 3 meshes with gear crown 9, and is freely turnable on shaft 14, while gear 4 is fixed to shaft 14 and meshes with gear 5 which is fixed to shaft 16. Gear 6 meshes with a stationary fixed rack bar 17, and is also fixed to shaft 16.

A rack bar 18 is fixed to a card transporting slide 19 and meshes with gear 3. Gear 7 meshes with gear crown 9, and is fixed to a shaft 48. A gear, not shown, is fixed on shaft 48 and meshes with gear 8 which drives a centrifugal brake located in stationary housing 49 on shaft 11.

Gear 5 meshes with a rack bar 20 which is mounted on shafts 21 and 22 of an auxiliary card slide 23'. The rollers 23, 24, 25 and 26 are guided between two pairs of guide rails 27, 28 and 27', 28'. A card knife 30 takes the lowest card 31 of a stack of cards and move the same in the direction of the arrow B under control of gear 5.

The guide rail 39 is connected by two members 37 and 38 to the rack bar 18, and supports a card transporting member 41 for turning movement on a pin 40. A torsion spring 42 urges member 41 into an operative position in which it engages the card 31. Member 39 further carries a stop lever 44 which is biased by spring 45 and engages card 31 to hold the same in the proper position, while releasing card 31 at the end of the transporting motion.

The apparatus shown in FIG. 1 operates in the following manner: The one-revolution coupling described with reference to FIG. 9 effects turning of the pulley 35 for one complete revolution, at the end of which arm 33 is in the illustrated position. When the one-revolution coupling is coupled, pulley 35 turns, so that during the first 180° of the turning movement, slide 1 moves with the gears mounted thereon along the guide shafts 2 in the direction of arrow B. Gear 6, which meshes with the stationary rack bar 17, turns in counterclockwise direction, and such turning movement is transmitted by gear 5 to gear 4, and by shaft 14 and arm 15, stop 13 to gear 3. Gear 3 rotates the gear crown 9 so that the spring of the spring motor 10 is tensioned. Shaft 11 cannot turn, since it is locked by the pawl 50. The turning movement of gear 3 is further transmitted to the rack bar 18 to move the same in the direction of the arrow A, while gear 5 turns in counterclockwise direction to move rack bar 20 in the direction of the arrow B. Consequently, the card transporting means 19 moves in the direction of the arrow A, and the auxiliary card transporting means 23' moves in the direction of the arrow B until the card 31 transported by transporting means 23' is engaged by member 41. During this operation, card 31 is pushed under the spring-loaded member 41 until member 41 snaps behind the trailing edge of card 31 which has been transported by transporting means 23' in the direction of the arrow B.

When pulley 35 and arm 33 have completed half a revolution, the slide 1 is moved in the direction of the arrow A, together with the gears mounted thereon. The direction of rotation of gear 6 is reversed, and effects a movement of the auxiliary transporting means 23' by gear 5 and rack bar 20 in the direction of the arrow A so that transporting means 23' is again placed under the stack of cards at the end of one complete revolution of pulley 35. In the meantime, arm 15 also turns in counterclockwise direction, and releases stop 13 of gear 3 so that the spring motor 10 becomes effective to move transporting means 19 in the direction of the arrow B so that the card 31 held by members 41 and 44 is transported under the punches 87. In accordance with the present invention, the controlled card transporting means 19, which include members 41, 44, 39 must be stopped when selected columns of the card are located underneath the punches. The columns in which the card is stopped, correspond to the columns of the record sheet in which entries are made by printing means 204 while the record sheet is mounted on the platen 205.

The motion control arrangement which controls the card transporting means 19 is shown in FIG. 2 and in FIG. 5b, but omitted in FIG. 1 for the sake of clarity.

Referring now to FIG. 2 the gear 3 on shaft 14 meshes with rack bar 18, as described by reference to FIG. 1. Rack bar 18 carries a bracket 51 from which a fixed shaft 52 projects. A member 53 is turnably mounted on a portion of shaft 52, and includes an arresting means 54 cooperating with a ratchet bar 56, and a feeler means 55 which extends across a set of control bars 57, and a clearing bar 75. A spring 86 on shaft 52 urges member 53 into a position in which the arresting means 54 engages ratchet bar 56, and thus prevents motion of the card transporting means 19 with rack bar 18, bracket 51 and member 53. However, if feeler means 55 is turned in clockwise direction as viewed in FIG. 2, arresting means 54 will release bar 56, and the card transporting means 19 will be free to move in the direction of the arrow B. Since the card transporting means 19 is driven by the spring motor 10 during movement in this direction, it can be stopped by the arresting means 54, and will continue its movement as soon as arresting means 54 releases the teeth of the arresting bar 56.

A contact means 58 is secured to member 53 and turns with the same so that a pair of contact bars 59, which are mounted in the insulating bar 60, are engaged by contact means 58 when arresting means 54 is in the arresting position engaging arresting bar 56.

The switch 58, 59 has been described with reference to FIG. 10, and it will now be understood that the electromagnetic means 151 can only be energized when the card transporting means 19 is arrested by member 54.

Seven control members or control bars 57a to 57g are shown in FIG. 2 extending parallel to each other, and to a clearing bar 75. Control bars 57 and clearing bar 75 have vertical slots 61 and 62 through which a pair of guide shafts 63 and 64 pass so that bars 57 and 75 can move up to an inoperative position and down to an effective position in which the lower edge thereof is located in the region of the upper edge of the feeler blade 55 which crosses all bars 57 and 75. The lower edges of the control bars 57 are provided with projections and recesses which are sensed by the feeler blade 55 when the bars are in the lower effective position.

Each bar 57 and 75 is connected by a pair of levers 65, 66 to a parallel link 67, the links 67 being respectively articulated to pivotally mounted angular levers 68 connected by links 69 to sensing levers 70 which are turnably mounted on a stationary shaft 73. Springs 74 act on sensing levers 70 to turn the same in clockwise direction into engagement with tabs 71 set according to a program on the program carriage 72 which has been described with reference to FIG. 5b to move in synchronism with the bookkeeping carriage of the accounting machine. The angular lever 68 of clearing bar 75 is connected by link 77 to another angular lever 76 which is operated by a link 78 under control of cam means operated by the main shaft of the machine, or, as shown in FIG. 5b, link 78 is connected to a sensing lever 70 and controlled by tab 71 on the program carriage 72.

The projections and recesses on the lower edges of the control bars 57 are arranged and distributed in accordance with the present invention in a manner best seen in FIG. 4. The eight control bars 57a to 57g are shown in FIG. 4 in side views placed above each other, and showing the projections and recesses aligned in the same manner as they are aligned when the control bars 57 are located adjacent each other in the actual construction of the machine.

Control bar 57a has forty recesses 79 and thirty-nine intermediate projections 79', the projections and recesses being of equal length which corresponds to the width of the column of a card having eighty columns. The distance between the beginning of the first recess 79 and the fortieth recess 79 corresponds exactly to the width of the eighty columns of the card, as indicated by the numerals one to eighty in the side view of control bar 57a in FIG. 4.

The control bar 57b has twenty recesses 80, and nineteen projections between the recesses 80, the projections and recesses being of the same length, which is twice the length of the projection 79' and recesses 79 of control bar 57a, and consequently corresponds to two columns of the card.

The recesses 80 of the control bar 57b are arranged in such a manner that the beginning of the first recess 80 is aligned with the end of the first recess 79.

Control bar 57c is provided with 10 recesses 81 separated by projections of the same length, each recess or projection of control bar 57c having twice the length of a recess or projection of control bar 57b, and four times the length of a projection or recess of control bar 57a. The beginning of the first recess 81 is aligned with the end of the first recess 80 in control bar 57b, and aligned with the end of the second recess of control bar 57a so that the recess 81 extends over the fourth, fifth, sixth, and seventh column of the card.

The recesses in the control members 57d to 57g are arranged and distributed according to the same system, and each recess in any one control bar has twice the length of a recess in the preceding control bar, and extends over one projection and one recess of the respective preceding control bar. The beginning of each first recess in every bar is aligned with the end of the first recess of the preceding bar. Control bar 57f has only one full sized recess, the corresponding projection terminating at the point aligned with the end of the last recess in control bar 57a. Control bar 57g has even the first recess incomplete, the beginning of such first recess being aligned with the end of the first and only recess in the control bar 57f.

From the above explanation of the construction of the control bars 57, it will become apparent that the lengths of the recesses of the control bars 57 are designed in the ratio 1:2:4:8:16:32:64.

The position of the control bars 57 shown in solid heavy lines in FIG. 4 is the inoperative position, while the effective position of the control bars is shown in broken lines in FIG. 4. The clearing bar 75 has no recesses, but is also movable between an inoperative and an effective lower clearing position.

Member 53 is shown several times in FIG. 4, but it will be understood that the four illustrations of member 53 appearing on the left side of FIG. 4, and the three illustrations of the member 53 appearing on the right side of FIG. 4, show two different positions of member 53. For example, member 53 may be in a position in which its feeler blade 55 extends in the region of the first recess in control bar 57d, the second recess 81 of control bar 57c, the fourth recess 80 of control bar 57b, and the seventh recess 79 of control bar 57a.

Figure 2A:
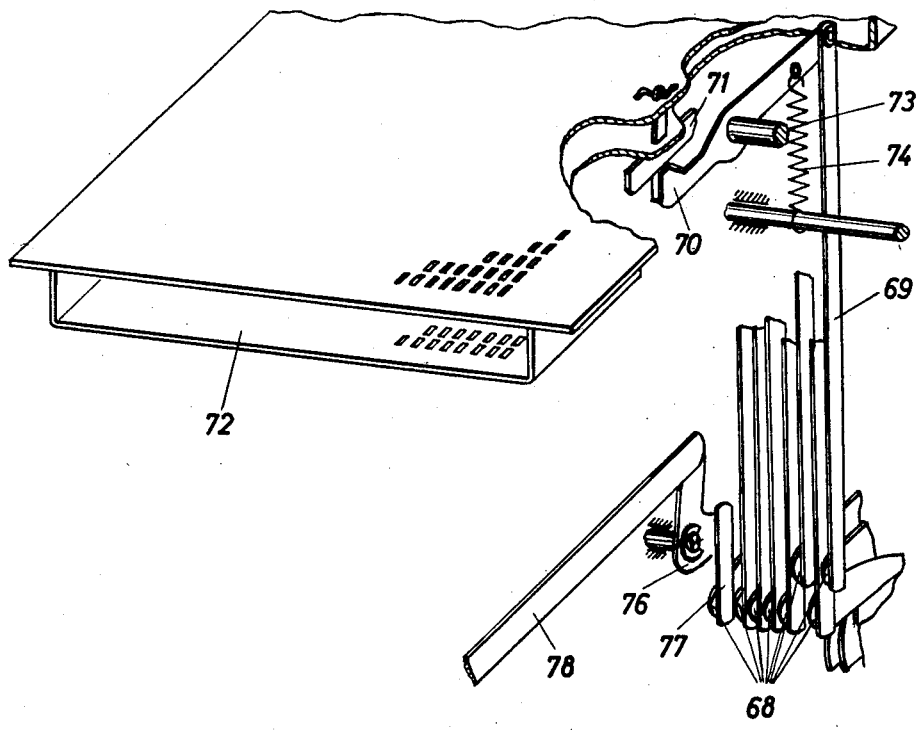
FIG. 2 is a perspective view taken in the direction of the arrow II in FIG. 1 and includes two separated portions FIG. 2a and FIG. 2b illustrating the motion control arrangement by which the movement of the card transporting means is controlled.

Springs 73, see FIG. 2a, urge through the above-described linkage means 69, 68, 67, 66, 65 the control bars 57 to the inoperative raised position shown in solid lines in FIG. 4. When one or several sensing levers 70 engage tabs 71 on the program carriage 72, the respective control bars 57 are lowered to the effective position shown in broken thin lines in FIG. 4.

When member 53 is in the illustrated arresting position, sensing means 55 is in a higher sensing position which, however, is still spaced from control bars 57 in inoperative positions. When one or several control bars 57 are lowered to the effective positions, they are in the region of the feeler blade 55. If a recess of the respective effective control bar 57 is located over the feeler blade 55, member 53 will not be moved to the releasing position in which arresting means 54 releases arresting bar 56. However when feeler blade 55 is engaged by a projection of one of the control bars 57 or by the clearing bar 75, in the effective position, member 53 will be pivoted in clockwise direction as viewed in FIG. 2, and in counterclockwise direction as viewed in FIG. 4 until arresting means 54 releases locking bar 56.

At the beginning of an operation, the card transporting means 19 and the program carriage 72, together with the bookkeeping carirage 214 move from an initial terminal position into a position associated with the first accounting column on the sheet on the bookkeeping carriage, and on the card to be punched. It is assumed that the first column receives an entry which has only a single order, in which event the control bar 57a is moved under control of a tab 71 in the first column and line of the program carriage 72 to the effective position so that the feeler means 55, which is still on the left of the first recess 79 of control bar 57a, is displaced and effects movement of the arresting means 54 to a releasing position releasing arresting bar 56 so that the spring motor 10 turns gear 3 to move rack bar 13 and thereby member 53 with feeler means 55 in the direction of the arrow B until the feeler 55 falls under the action of spring 86 into the first recess 79 of control bar 57a so that arresting means 54 engages the next following tooth of the arresting bar 56 and stops the card transporting means 19 in a position in which the first column of card 31 is located under a punch 87.

In the event that the first main column, or punching area would require the entry in two orders, instead of control bar 57a, control bar 57b would be moved to the effective position by corresponding tab 71 on program carriage 72. In this event, feeler 55 would fall into the first recess 80 of control bar 57b. If the first main column, or punching area, includes three columns for three orders, control bar 57a as well as control bar 57b will be moved by control tabs 71 to the effective position so that the first recess 79 of control bar 57a would be covered by the lower edge of control bar 57b, the first half of recess 80 would be covered by the first projection 79' of control bar 57a, and a turning of member 53 would only be possible when the feeler means 55 falls into the second recess 79 of control bar 57a and into the second part of recess 80 of control bar 57b, resulting in stopping of the card transporting means 19 when the card has been moved to a position in which the first three columns of the card are located underneath the punches 87 of three orders.

In the event that an entry is to be made in the sixty-seventh column, control bars 57a, 57b and 57g must be moved to the effective position so that the feeler means 55 finds the first aligned recesses when it is located opposite the recess of the control bar 57a which is associated with the sixty-seventh column as shown on the right side of FIG. 4.

Due to the arrangement and distribution of the recesses of the control bars, the number of columns increases with each additional control bar by a power of two, so that control bar 57a corresponds to $2^0$, the control bar 57b corresponds to $2^1$, the control bar 57c corresponds to $2^3$ etc.

When an accounting operation has been completed, the control link 78 is either actuated from the accounting machine, or from the punching device so that the clearing bar 75 is moved to the effective position shown in broken lines in FIG. 4 so that the feeler means 55 is engaged and moves out of the recesses of the control bars 57 in which the feeler means was located. In this manner, the arresting means 54 is turned to a releasing position in which transporting means 19 can move farther, and finally to its end position in which the card is deposited in a suitable receiver.

If it is desired to perform the punching or sensing, respectively, in accordance with another program, it is only necessary to exchange the control bridge 72 for another control bridge 72 in which the tabs 71 are placed in accordance with another program.

It is necessary that the number of punches corresponds to the number of columns of the respective punching area, and this is obtained by a motion control arrangement according to the present invention which moves a punch controlling means to render the number of punches effective, which are required for punching the necessary number of columns in the card. This motion control arrangement will now be described with reference to FIG. 5b, and FIG. 3.

Figure 3A:
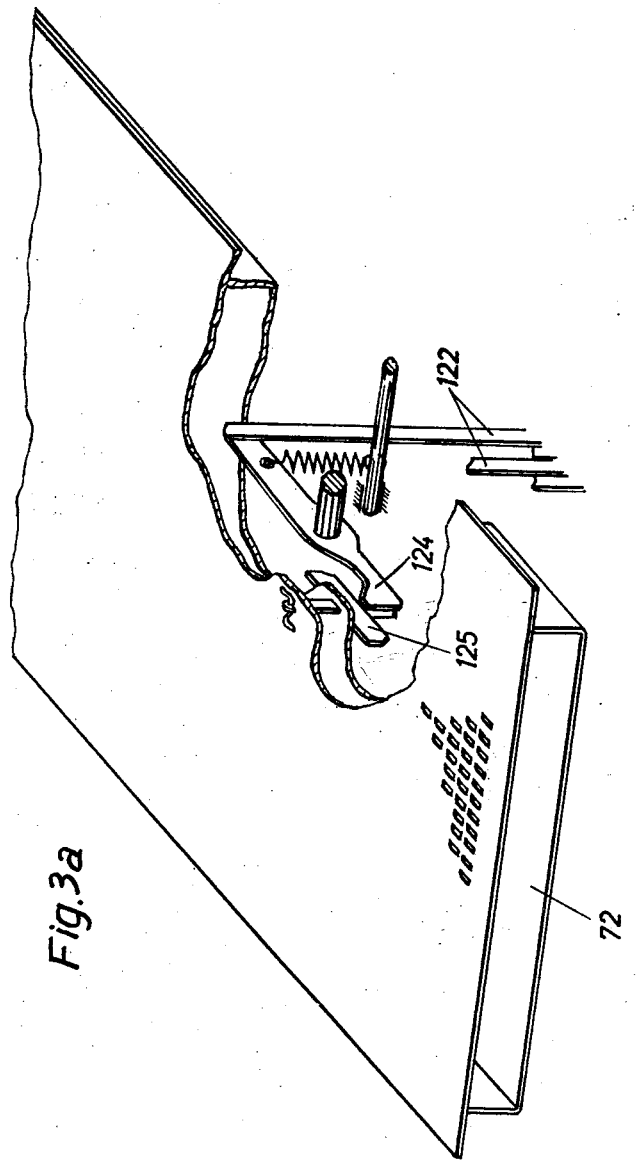
FIG. 3 is a fragmentary perspective view illustrating a motion control arrangement according to the present invention for controlling the motions of a punch controlling slide and includes two separated portions FIG. 3a and FIG. 3b.

Above the punches 87, a set of hammers 88 are arranged which terminate in hammer heads having upper portions 90, and lower portions 89 cooperating with the punches 87. Each member 88 can be shifted along the respective row of punches in the respective order under control of the members 206 which sense the pin carriage so that the respective projection 89 is placed above the punch 87 associated with the respective digit in the respective order. As explained with reference to FIG. $5b^1$, punch controlling slide 91 is downwardly moved by eccentric members 161 and bridge member 163 when punching of the card is carried out, and slide 91 must be placed over a number of hammer-heads 90, 89 corresponding to the number of orders and columns to be punched in the card. As shown in FIG. 3, punch controlling slide 91 has a larger cutout 92 and a smaller cutout 93. When the punch controlling slide 91 is in a retracted position, the cutout 92 will be located over all hammer-heads 92. When the slide is advanced in the direction of the arrow B in FIG. 3b, the plate portion of slide 91 will be located above the first hammer-head 90 of the first column, and when slide 91 is moved further, its plate portion will be located over two or more hammer-heads to effect actuation of two or three, or more punches 87 when slide plate 91 moves downward together with member 163.

An angular bracket 94 is secured to the punch controlling slide 91 and connected by a pin 96 to a plate 97 which carries another pin 98 located in a slot of the forked end 99 of an angular lever 100 which pivots about a pin 101. At the end of the second arm of angular lever 100, a cam follower pin 102 is mounted which engages the peripheral cam track of a cam 105 under the action of a spring 103 which is secured to a pin 104 on lever 100. Shaft 106 carries in addition to cam 105 another cam 107, and is driven by pulley 35 when the one-revolution coupling is connected, as described with reference to FIG. 5b.

A second angular lever 108, which is also turnable on shaft 101, cooperates with the peripheral cam track of cam 107 and has a forked arm 109 receiving a pin 110 secured to the clearing member 111. Clearing member 111 is a plate having an oblique recess 112 through which the stationary shaft 113 passes.

Control members or bars 114a to 114d are arranged parallel to each other and have upper edges formed with projections and recesses which are arranged and constructed in exactly the same manner as the projections and recesses of the control bars 57a to 57d. A stationary arresting bar 116 has arresting teeth cooperating with an arresting means 117 of a member 118 which has a feeler means 119. Member 118 is rockably mounted on a pin 126 fixed to plate 97. A spring 127 urges member 118 into a position in which arresting means 117 engages the teeth of arresting bar 116. The feeler means 119 senses aligned projections and recesses of control bars 114a to 114d in the same manner as feeler 55 senses the projection and the recesses of control bars 57.

Control bars 114 have slots 120 through which stationary guide shafts 120' pass so that control bars 114 can be moved up and down between a lower inoperative position and a higher effective position in which the projection and recesses cooperate with feeler means 119. Angular levers 121 are mounted on shaft 113 for turning movement and are articulated to parallel links 123 which, corresponding to the parallel links 67 explained with reference to FIG. 2 effect shifting of selected control bars parallel to itself. Links 122 are articulated to the levers 121 and are articulated to sensing levers 124 which sense tabs 125 on the program carriage 72.

The plate 97 is shifted under control of cam 105 together with slide 91 is a horizontal direction which is perpendicular to the direction of movement of the hammers 90.

Before each punching operation, plates 91 and 97 are moved under control of cam 105 in the direction of the arrow B so that plate 91 covers as many rows of punches as columns are to be punched in their respective area. If plate 91 would be advanced too far, more columns would be punched than are provided in the respective punching area, which corresponds to a main column of the record sheet on the bookkeeping carriage.

In an initial position which is obtained after every punching operation, cam 105 is in a position in which the cam follower pin 102 of lever 100 is on the highest point of the dwell of cam 105 so that plate 97 is retracted to an extreme position to the right, and plate 91 is correspondingly retracted from the punch hammers 90. When shaft 106 starts to rotate under control of the one-revolution coupling, cam 105 turns, and spring 103 becomes effective to turn lever 100 in counterclockwise direction as viewed in FIG. 3b with cam follower 102 moving on a descending cam track portion of cam 105. The movement of the lever 100 is transmitted by pin 98 to plate 97 and from there to pin 96 and bracket 94 to slide 91 so that it moves in the direction of the arrow B. How far such movement extends, is determined by the control bars 114 and by the arresting bar 116. As soon as the feeler means 119 falls into a set of aligned recesses of control bars 114 in effective positions, as explained for control bars 57 with reference to FIG. 4, arresting means 117 engages a tooth of the arresting bar 116 and stops the movement of plate 97 on which member 118 is mounted. In this manner, the slide 91 is stopped in a position in which the desired number of hammers 90 is located under plate 91, so that downward movement of plate 91 with member 163 under control of eccentrics 161 will effect downward movement of the respective covered hammers 90, and operation of those punches 87 which are located underneath the actuated hammers 90. The tabs 125 are set in such a manner that the number of actuated punches corresponds to the number of columns of the transported card located under the punches. For example, if the motion control arrangement illustrated in FIG. 2 has effected motion of the card transporting means 19 through three columns, the motion control arrangement of FIG. 3 will effect shifting of the punch controlling slide 91 also through three steps to cover three punches so that the same may punch the three columns of the card located underneath the actuated punches.

The second cam 107 is designed and arranged so that after the termination of the punching operation, cam follower lever 108 is moved in clockwise direction so that the clearing bar 111 is actuated to move to the right as viewed in FIG. 3b. Since the oblique slot 112 moves on shaft 113, the clearing member 111 moves also upwardly and engages the feeler means 119 to turn member 118 in clockwise direction whereby arresting means 117 is retracted from the arresting bar 116. During this phase of the turning movement of shaft 106, the radial dwell of cam 105 has again reached cam follower pin 102, and due to the further turning movement of shaft 106, pin 102 is again placed on the radial extremity of cam 105. Cam 107 is designed and constructed in such a manner that during this part of the operation, the clearing member 111 remains in the effective position releasing the arresting means 117. At the end of the operation, the clearing member 111 is released and returned by spring 128 to the inoperative position.

The cutout 92 in the punch controlling plate 91 is arranged in such a manner that none of the punch hammers 90 is covered when plate 91 is in the initial position thereof. The cutout 93 is provided for the punching of extra holes representing plus, minus and sum symbols, as will be explained hereinafter.

Since the entire control arrangement is controlled by tabs 125 in the program carriage 72, it is only necessary to exchange the bridge 72 when a new program is set on the accounting machine.

The links 69 and 122 which control the movement of the control bars 57 and 114 to and from the effective position thereof, may also be operated by electric or pneumatic means instead of by direct mechanical actuation by tabs 71 and 125. For example, a tab may close a switch effecting energizing of an electromagnetic means by which the respective rod 69 or 122 is shifted.

A motion control arrangement in accordance with the present invention is advantageously used for controlling the punching of extra holes in the card for the purpose of representing plus, minus and sum symbols. This arrangement will now be described with reference to FIG. 5b, 5b' and to FIGS. 6, 7 and 8. It is assumed that the extra hole representing "sum" is to be provided in the eleventh line of the column associated with the second decimal order. An extra hole representing "minus" is to be punched in the eleventh line, and an extra hole representing "plus" is to be punched in the twelfth line.

Punches 166 are provided for punching the extra holes, as shown in FIG. 5b'. Punches 166 cooperate with a set of punch hammers 168 having hammer-heads 167. The punch hammers have slots 173 through which a control shaft 175 passes, control shaft 175 being supported on a pair of angular levers 177 and 178 which are turnable about a shaft 176 and are controlled by cam 181 fixed on shaft 146 and cooperating with a cam follower 179 on arm 178' of lever 177. Springs 174 are secured to member 163 by means of a bracket, and connected to projections of the punch hammers 168 to urge the punch hammers 168 to the left as viewed in FIG. 5b'. As long as shaft 175 is located at the end of slot 173, punch hammers 168 cannot move to the left as viewed in FIG. 5b', but when during rotation of cam 181 levers 177 and 178 turn in counterclockwise direction under the action of spring 182, all punch hammers 168 are urged by springs 174 to move to the left. However, punch hammers 168 have upper edges formed with projecting teeth 169 cooperating with four pairs of control bars 170a, 170a' to 170d, 170d'. Two further control bars 171 and 172 extend parallel to control bars 170, and cooperate with a projecting tooth on punch hammers 168.

The pairs of control bars 170 serve for selecting the punch hammer 168 which is located in the column in which a plus or minus symbol is to be punched, while the control bar 171 determines how far the selected punch hammer 168 moves so that the hammer-head 167 thereof is either located over the eleventh or over the twelfth line of the respective column, to represent either a minus or a plus symbol.

The control bar 172 cooperates only with the punch hammer 168 which is located in the second column of the respective main column and consequently associated with the second decimal order. Control bar 172 has a single projection, as shown in FIG. 8, located where the respective punch hammer 168/2 crosses control bar 172.

All other control bars 170, and control bar 171 have a cutout aligned with the projection of control bar 172, permitting the respective punch hammer 168/2 to move in the second column, until its head 167 reaches the eleventh line. In contrast to the motion control arrangement described with reference to FIGS. 1 and 3 where the control bars 57 and 114 are sensed in longitudinal direction, the toothed portions of the punch hammers 168 move perpendicular to the control bars 170, 171 and 172.

The control bars 171 and 172 are respectively suspended on parallelogram linkages including a pair of levers 196, a parallel link 198, and two levers 197, one of which is a double-armed lever having an arm connected to the electromagnetic means 183 and 184. When the respective electromagnetic means is energized, the pivoting of the levers effects a raising of bar 171, or of bar 172. When bar 172 is raised its single projection (see FIGS. 6 and 8) is raised out of the way of the rear most tooth of the respective punch hammer bar 168. Control bar 171 is normally in the lower blocking position blocking all bars 168, except the sum bar 168/2 which is located in the single recess of control bar 171, as shown in FIG. 8 When control bar 171 is raised, all bars are free to move one step, but only one bar actually moves since only one bar is permitted to move by the control bars 170.

The four pairs of control bars 170 are also suspended on parallelogram linkages, but the movement of control bars 170 between inoperative and effective positions is controlled by tabs on the program carriage 72 of the machine.

Tabs 185a, 185b. 185c and 185d are set on the program carriage 72 and are sensed by sensing levers 186a, 186b, 186c, and 186d which are connected by links 187a, 187b, 187c, and 187d to bell crank levers 188a, 188b, 188c, and 188d which are all mounted on a shaft 19 for turning movement. The bell crank levers 18 have arms 192a, 192c, and 192d provided with two slots 190 and 191, as best seen in FIG. 7 which shows the linkage means for the pair of control bars 170d and 170d'. Parallelogram linkages are provided for suspending the control bars 170, and include a pair of levers 196, 197 (196', 197'), and a parallel link 198 (198'). The construction is shown in detail for the control bars 170d and 170d' in FIG. 7. Two pins 199 and 200 connect levers 197, 197' with the arm 192 of the respective bell crank lever 188d. Pin 199 is secured to lever 197 and projects into slot 190, while pin 200 is secured to lever 197' and projects into the slot 191. The two slots 190, 191 are arranged in the respective arm of the respective bell crank lever 188d angularly displaced to each other. The connection between the other bell crank levers 188a, 188b, 188c to the other links actuating the control bars 170a, 170a' 170b, 170b', 170c, 170c' is effected in the same manner. When the bell crank levers 188 are in the normal position, all control bars 170a, 170b, 170c, 170d are raised, while all control bars 170a', 170b', 170c', 170d' are in a lower position, as shown in solid lines in FIG. 8. When one of the bell crank levers 188 is turned under control of a tab 185 on the program carriage 72, the respective pair of control bars 170 is simultaneously shifted so that, for example, the control bar 170a would be lowered to the effective position shown in broken lines in FIG. 8, while the control bar 170a' will simultaneously be raised to the position shown in broken lines in FIG. 8. This simultaneous shifting movement is produced by the angular position of the slots 190, 191.

Similar to the arrangement of the projection and recesses of the control bars 57 and 114, control bars 170a 170a' to 170d, 170d' have rectangular recesses and projections best seen in FIG. 8.

It will be noted that the lateral distance between the control bars 170a, 170a', 170b, 170b', 170c, 170c', 170d, 170d' corresponds to a width of a column on the punch card. The length of the recesses and projections of control bars 170a,a', 170b,b', 170c,c', 170d,d' corresponds to the corresponding elements of control bars 57a, 57b, 57c. The length of the recesses and projections in the control bars 170c and 170c' is twice the length of the recesses in control bars 170d and 170d', the length of the recesses and projections in control bars 170b and 170b' is double the length of the recesses in control bars 170c and 170c', and the length of the recesses and projections in the control bars 170a and 170a' is theoretically double the length of the recesses in the control bars 170a and 170a'.

As clearly shown in FIG. 8, in each pair of control bars, a projection of one control bar is aligned with a recess of the other control bar. Furthermore, the recesses in the control bars are staggered, each recess of a control bar beginning where a recess of a corresponding preceding control bar ends. However, the system of the recesses is disturbed by the single recess provided in all control bars 170 and 171 in the second decimal order. For example in the control bar 170d, one projection is omitted in the second decimal order, and in the control bar 170c', the first projection is shortened. Due to the staggering of the recesses, the recesses in the control bars 170a and 170a' are incomplete.

In the schematic illustration of FIG. 8, a movement of the punch card from the left to the right is to be assumed so that the first decimal order corresponds to cents, and the second decimal order corresponds to ten cents per unit. In the position illustrated in FIG. 8, all punch hammer bars 168 are stopped. Member 168/1 of the first order is stopped by the first projection of control bar 170d', member 168/2 is stopped by the single projection of control bar 172, member 168/3 is stopped by the second projection of control bar 170d and 170c', member 168/4 is stopped by the control bar 170b', member 168/5 is stopped by control bars 170d' and 170b', member 168/6 is stopped by the control bars 170c' and 170b', member 168/7 is stopped by control bar 170d', 170c' and 170b', member 168/8 is stopped by control bar 170a' member 168/9 is stopped by control bar 170d' and control bar 170a, member 168/10 is stopped by control bar 170c' and 170a', member 168/11 is stopped by control bar 170d', 170c' and 170a', and member 168/12 is stopped by control bar 170b' and 170a'. Assuming that the punching of extra holes representing the symbols "minus" and "sum" is desired, and that an extra hole "minus" is to be punched in the sixth decimal order, the control bars 170b and 170c are lowered and the control bars 170b' and 170c' are raised under control of tabs 165b and 165c on the program carriage 72. Rotation of cam 181 under control of the one-way coupling on shaft 146, has released angular lever 177, 178' so that the same can turn in counterclockwise direction as viewed in FIG. 5b' whereby the shaft 175 releases all punch hammer bars 168 for movement to the left under the action of springs 174. It will be noted that the intermediate lever 180 connects cam 181 to cam follower 173 in FIG. 5b', while this intermediate member 180 is omitted in FIG. 6 for the sake of simplicity. In any event, all released punch hammer bars 168 tend to move to the left as viewed in FIG. 5b, but are blocked, except the bar 168 which is aligned with the column of the punch card associated with the sixth decimal order and being the sixth column in the respective main column or punching area. This bar 168 moves until it is either stopped by the control bar 171 in its normal lower position, or moves one step farther to be stopped by the shaft 175 engaging the end of the slot 173. Since the punching of an extra hole "minus" was intended, control bar 171 is raised by electromagnetic means 184 which is energized when a control tab on the program carriage 72 closes a corresponding switch. Since punch hammer bar 168 moves all the way to the left as viewed in FIG. 5b', the punch hammer 167 is located over the punch 166 in the eleventh line of the respective column for the sixth decimal order, and the extra hole produced by the respective punch 166 represents a minus symbol.

If control bar 171 is not raised due to a control impulse received by the electromagnetic means 184, punch hammer bar 168 is stopped by control bar 171 in a position in which the hammer-head 167 is located over the punch 166 in the twelfth line of the respective column. In both positions, the hammer-head 167 is located under the punch controlling and actuating slide 91, so that one of the punches 166 is operated together with the punches 87 which are operated by punch hammers 90 within the first ten orders, the number of columns and orders punched being determined by the position of the punch controlling actuator slide 91, as explained with reference to FIG. 3.

In order to punch an extra hole representing a sum, electromagnetic means 183 receives an impulse from the program means, and raises control bar 172 so that the respective punch hammer 168 which is associated with the extra hole for a sum, is free to move into a position in which its hammer-head 167 is located in the eleventh line of the column associated with the second decimal order, that is over the second punch 166 from the right as viewed in FIG. 5b.

After the punching of the respective columns of the card has been completed, further turning of cam 181 returns lever 177, 178' in clockwise direction so that shaft 175 withdraws all punch hammer bars 168 to the right as viewed in FIG. 5b. When the single revolution of shaft 146 under control of the one-way coupling is completed, shaft 175 stops in this position, holding all punch hammers 168 in the illustrated retracted inoperative position.

However, for reasons explained above, rotation of cam 181 during a cycle of the machine will not necessarily result in movement of the punch hammers 168, since punch hammers 168 are normally stopped by control bars 170, 171 and 172, and are only permitted to move when a corresponding program is set on the program carriage 72 for example by tabs 185.

It will be understood that each of the elements described above, or two or more together, may also find a useful application in other types of accounting machines differing from the types described above.

While the invention has been illustrated and described as embodied in a motion control arrangement including control bars with correlated projections and recesses for controlling the motions of a controlled means, such as a card transporting slide or a punch actuating slide, in synchronism with the movement of a bookkeeping carriage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

1. In a business machine, in combination, a motion control arrangement comprising controlled means including a card transporting means movable between a plurality of operative positions respectively associated with the columns of a transported card; means for moving said controlled means to said operative positions; a set of control members, each control member being formed with projections and recesses correlated with different operative positions of said controlled means and being movable between an inoperative position and an effective position, said projections and recesses of each of said control members extending through different distances and being constructed and arranged in such a manner that a projection or a recess of each successive control member has the same length as a projection and a recess of a preceding control member, the number of projections and recesses of each control member being different, said different numbers being successive powers of two, the projections and recesses of each control member, in which at least one complete projection and one complete recess is provided, being of equal length, the beginning of the first recess of the second control member being aligned with the end of the first recess of the first control member, and so forth so that the beginning of the first recess of a third control member is aligned with the end of the first recess of the second control member and so forth; program means including a movable program carriage and a set of settable tabs on said program carriage respectively correlated in the said control members; a set of linkage means respectively including movable sensing elements engaged by said tabs during movement of said program carriage and being respectively connected to said control members for moving selected control members to said effective position; and means for sensing projections and recesses of control members in said effective position and being operatively connected to said controlled means to control the movement of said card transporting means according to sensed projections and recesses so that said card transporting means stop in selected positions of said operative positions under control of said program means.

2. In a business machine, in combination, a motion control arrangement comprising controlled means including a card transporting means movable between a plurality of operative positions respectively associated with the columns of a transported card; means for moving said controlled means to said operative positions; a set of parallel control bars, each control bar being formed with projections and recesses correlated with different operative positions of said controlled means and being movable between an inoperative position and an effective position, said projections and recesses of each of said control bars extending through different distances and being constructed and arranged in such a manner that a projection or a recess of each successive control bar has the same length as a projection and a recess of a preceding control bar, the number of projections and recesses of each control bar being different, said different numbers being successive powers of two, the projections and recesses of each control bar, in which at least one complete projection and one complete recess is provided, being of equal length, the beginning of the first recess of the second control bar being aligned with the end of the first recess of the first control bar, and so forth so that the beginning of the first recess of a third control bar is aligned with the end of the first recess of the second control bar and so forth; program means including a movable program carriage and a set of settable tabs on said program carriage respectively correlated in the said control members; a set of linkage means respectively including movable sensing elements engaged by said tabs during movement of said program carriage and being respectively connected to said control bars for moving selected control bars in a direction transverse to the length of the same said effective position; and means for sensing projections and recesses of control bars in said effective position and being operatively connected to said controlled means to control the movement of said card transporting means according to sensed projections and recesses so that said card transporting means stop in selected positions of said operative positions under control of said program means.

3. In a business machine, in combination, a motion control arrangement comprising controlled means including a punch controlling means movable between a plurality of operative positions respectively associated with rows of punches adapted to punch columns of a card; means for moving said controlled means to said operative positions; a set of control members, each control member being formed with projections and recesses correlated with different operative positions of said controlled means and being movable between an inoperative position and an effective position, said projections and recesses of each of said control members extending through different distances and being constructed and arranged in such a manner that a projection or a recess of each successive control member has the same length as a projection and a recess of a preceding control member; program means operatively connected to said control members for moving selected control members to said effective position; and means for sensing projections and recesses of control members in said effective position and being operatively connected to said controlled means to control the movement of said punch controlling means according to sensed projections and recesses so that said punch controlling means stop in selected positions of said operative positions under control of said program means.

4. In a business machine, in combination, a motion control arrangement comprising controlled means including a card transporting means and a punch controlling means movable between a plurality of operative positions respectively associated with the columns of a transported card and with rows of punches adapted to punch columns of the transported card; means for moving said controlled means to said operative positions; two sets of control members, each control member being formed with projections and recesses correlated with different operative positions of said controlled means and being movable between an inoperative position and an effective position, said projections and recesses of each of said control members of each set extending through different distances and being constructed and arranged in such a manner that a projection or a recess of each successive control member has the same length as a projection and a recess of a preceding control member; program means operatively connected to said control members for moving selected control members to said effective position; and means for sensing projections and recesses of control members in said effective position and being operatively connected to said controlled means to control the movement of the same according to sensed projections and recesses so that said controlled means stop in selected positions of said operative positions under control of said program means.

5. In a business machine, in combination, a motion control arrangement comprising controlled means including a card transporting means and a punch controlling means movable between a plurality of operative positions respectively associated with the columns of a transported card and with rows of punches adapted to punch columns of the transported card; means for moving said controlled means to said operative positions; two sets of control members, each control member being formed with projections and recesses correlated wtih different operative positions of said controlled means and being movable between an inoperative position and an effective position, said projections and recesses of each of said control members of each set extending through different distances and being constructed and arranged in such a manner that a projection or a recess of each successive control member has the same length as a projection and a recess of a preceding control member, the number of projections and recesses of each control member of each set being different, said different numbers being successive powers of two, the projections and recesses of each control member, in which at least one complete projection and one complete recess is provided, being of equal length, the beginning of the first recess of the second control member of each set being aligned with the end of the first recess of the first control member, and so forth so that the beginning of the first recess of a third control member is aligned with the end of the first recess of the second control member and so forth; program means including a movable program carriage and a set of settable tabs on said program carriage respectively correlated with said control members; a set of linkage means respectively including movable sensing elements engaged by said tabs during movement of said program carriage and being respectively connected to said control members for moving selected control members to said effective position; and means for sensing projections and recesses of control members in said effective position and being operatively connected to said controlled means to control the movement of the same according to sensed projections and recesses so that said controlled means stop in selected positions of said operative positions under control of said program means.

6. In a business machine, in combination, a motion control arrangement comprising a controlled means movable between a plurality of operative positions; means for moving said controlled means successively to said operative positions; a set of control members, each control member being formed with projections and recesses correlated with different operative positions of said controlled means and disposed in one direction on said control member, each control member being movable in a direction transverse to said one direction between an inoperative position and an effective position; program means operatively connected to said control members for moving selected control members to said effective position; arresting means movable between a releasing position and an arresting position for stopping said controlled means in each of said operative positions; and feeler means connected to said arresting means and having a first position for holding said arresting means in said releasing position and a second position for holding said arresting means in said arresting position, said feeler means extending across said control members and being disposed to sense the projections and recesses of control members in said effective position to be moved between said first and second positions whereby said arresting means are operated to release said controlled means for movement or to stop said controlled means in selected operative positions determined by said program means.

7. In a business machine, in combination, a motion control arrangement comprising a controlled means movable between a plurality of operative positions; means for moving said controlled means successively to said operative positions; a set of control members, each control member being formed with projections and recesses correlated with different operative positions of said controlled means and disposed in one direction on said control member, each control member being movable in a direction transverse to said one direction between an inoperative position and an effective position, said projections and recesses of each of said control members extending through different distances and being constructed and arranged in such a manner that a projection or a recess of each successive control member has the same length as a projection and a recess of a preceding control member; program means operatively connected to said control members for moving selected control members to said effective position; arresting means movable between a releasing position and an arresting position for stopping said controlled means in each of said operative positions; and feeler means connected to said arresting means and having a first position for holding said arresting means in said releasing position and a second position for holding said arresting means in said arresting position, said feeler means extending across said control members and being disposed to sense the projections and recesses of control members in said effective position to be moved between said first and second positions whereby said arresting means are operated to release said controlled means for movement or to stop said controlled means in selected operative positions determined by said program means.

8. In a business machine, in combination, a motion control arrangement comprising a controlled means including a card transporting means movable between a plurality of operative positions respectively associated with the columns of a transported card; means for moving said controlled means successively to said operative positions; a set of control members, each control member being formed with projections and recesses correlated with different operative positions of said controlled means and disposed in one direction on said control member, each control member being movable in a direction transverse to said one direction between an inoperative position and an effective position, said projections and recesses of each of said control members extending through different distances and being constructed and arranged in such a manner that a projection or a recess of each successive control member has the same length as a projection and a recess of a preceding control member; program means operatively connected to said control members for moving selected control members to said effective position; arresting means movable between a releasing position and an arresting position for stopping said controlled means in each of said operative positions; and feeler means connected to said arresting means and having a first position for holding said arresting means in said releasing position and a second position for holding said arresting means in said arresting position, said feeler means extending across said control members and being disposed to sense the projections and recesses of control members in said effective position to be moved between said first and second positions whereby said arresting means are operated to release said controlled means for movement with said card transporting means or to stop said controlled means in selected operative positions determined by said program means.

9. In a business machine, in combination, a motion control arrangement comprising a controlled means including a card transporting means movable between a plurality of operative positions respectively associated with the columns of a transported card; means for moving said controlled means successively to said operative positions; a set of control members, each control member being formed with projections and recesses correlated with different operative positions of said controlled means and disposed in one direction on said control members, each control member being movable in a direction transverse to said one direction between an inoperative position and an effective position, said projections and recesses of each of said control members extending through different distances and being constructed and arranged in such a manner that a projection or a recess of each successive control member has the same length as a projection and a recess of a preceding control member, the number of projections and recesses of each control member being different, said different numbers being successive powers of two, the projections and recesses of each control member, in which at least one complete projection and one complete recess is provided, being of equal length, the beginning of the first recess of the second control member being aligned with the end of the first recess of the first control member, and so forth so that the beginning of the first recess of a third control member is aligned with the end of the first recess of the second control member and so forth; program means operatively connected to said control members for moving selected control members to said effective position; arresting means movable between a releasing position and an arresting position for stopping said controlled means in each of said operative positions; and feeler means connected to said arresting means and having a first position for holding said arresting means in said releasing position and a second position for holding said arresting means in said arresting position, said feeler means extending across said control members and being disposed to sense the projections and recesses of control members in said effective position to be moved between said first and second positions whereby said arresting means are operated to release said controlled means for movement with said card transporting means or to stop said controlled means in selected operative positions determined by said program means.

10. In a business machine, in combination, a motion control arrangement comprising a controlled means including a punch controlling means movable between a plurality of operative positions respectively associated with rows of punches adapted to punch columns of a card; means for moving said controlled means successively to said operative positions; a set of control members, each control member being formed with projections and recesses correlated with different operative positions of said controlled means and disposed in one direction on said control member; each control member being movable in a direction transverse to said one direction between an inoperative position and an effective position; program means operatively connected to said control members for moving selected control members to said effective position; arresting means movable between a releasing position and an arresting position for stopping said controlled means in each of said operative positions; and feeler means connected to said arresting means and having a first position for holding said arresting means in said releasing position and a second position for holding said arresting position, said feeler means extending across said control members and being disposed to sense the projections and recesses of control members in said effective position to be moved between said first and second positions whereby said arresting means are operated to release said controlled means for movement or to stop said controlled means in selected operative positions determined by said program means.

11. In a business machine, in combination, a motion control arrangement comprising a controlled means including a card transporting means and a punch controlling means movable between a plurality of operative positions respectively associated with the columns of a transported card and with rows of punches adapted to punch columns of the transported card; means for miving said controlled means successively to said operative positions; two sets of control members, each control member being formed with projections and recesses correlated with different operative positions of said controlled means and disposed in one direction on said control member, each control member being movable in a direction transverse to said one direction between an inoperative position and an effective position, said projections and recesses of each of said control members of each set extending through different distances and being constructed and arranged in such a manner that a projection or a recess of each successive control member has the same length as a projection and a recess of a preceding control member; program means operatively connected to said control members for moving selected control members to said effective position; arresting means movable between a releasing position and an arresting position for stopping said controlled means in each of said operative positions; and feeler means connected to said arresting means and having a first position for holding said arresting means in said released position and a second position for holding said arresting means in said arresting position, said feeler means extending across said control members of each set and being disposed to sense the projections and recesses of control members in said effective position to be moved between said first and second positions whereby said arresting means are operated to release said controlled means for movement or to stop said controlled means in selected operative positions determined by said program means whereby said card transporting means and said punch controlling means simultaneously stop in positions correlated with the same card column.

12. In a business machine, in combination, a motion control arrangement comprising a controlled means including a card transporting means and a punch controlling means movable between a plurality of operative positions respectively associated with the columns of a transported card and with rows of punches adapted to punch columns of the transported card; means for moving said controlled means successively to said operative positions; two sets of control members, each control member being formed with projections and recesses correlated with different operative positions of said controlled means and disposed in one direction on said control member, each control member being movable in a direction transverse to said one direction between an inoperative position and an effective position, said projections and recesses of each of said control members of each set extending through different distances and being constructed and arranged in such a manner that a projection or a recess of each successive control member has the same length as a projection and a recess of a preceding control member, the number of projections and recesses of each control member of each set being different, said different numbers being successive powers of two, the projections and recesses of each control member, in which at least one complete projection and one complete recess is provided, being of equal length, the beginning of the first recess of the second control member of each set being aligned with the end of the first recess of the first control member, and so forth so that the beginning of the first recess of a third control member is aligned with the end of the first recess of the second control member and so forth; program means operatively connected to said control members for moving selected control members to said effective position; arresting means movable between a releasing position and an arresting position for stopping said controlled means in each of said operative positions; and feeler means connected to said arresting means and having a first position for holding said arresting means in said releasing position and a second position for holding said arresting means in said arresting position, said feeler means extending across said control members of each set and being disposed to sense the projections and recesses of control members in said effective position to be moved between said first and second positions whereby said arresting means are operated to release said controlled means for movement or to stop said controlled means in selected operative positions determined by said program means.

13. In a business machine, in combination, a motion control arrangement comprising controlled means movable between a plurality of operative positions; means for moving said controlled means to said operative positions; a set of pairs of control members, each control member being formed with projections and recesses, each pair of control members being correlated with different operative positions of said controlled means, and having an inoperative position in which one control member is advanced and the other control member is retracted, and an effective position in which said one control member is retracted and said other control member is advanced; program means operatively connected to said pairs of control members for moving selected pairs to said effective position; and means on said controlled means for sensing projections and recesses of said pairs of control members and controlling the movement of said controlled means according to sensed projections and recesses of pairs of control members in said effective position so that said controlled means stop in selected operative positions under control of said program means.

14. In a business machine, in combination, a motion control arrangement comprising controlled means including a plurality of parallel controlled bars longitudinally movable between a plurality of operative positions; means for moving said controlled means to said operative positions; a set of pairs of control members located in parallel planes transverse to said controlled bars, each control member being formed with projections and recesses, each pair of control members being correlated with different operative positions of said controlled means, and having an inoperative position in which one control member is advanced and the other control member is retracted, and an effective position in which said one control member is retracted and said other control member is advanced; and program means operatively connected to said pairs of control members for moving selected pairs to said effective position; and teeth on said parallel controlled bars sensing projections and recesses of said pairs of control members to block selected controlled bars and to permit movement of a selected controlled bar to a selected operative position under control of said program means.

15. In a business machine, in combination, a motion control arrangement comprising controlled means movable between a plurality of operative positions; means for moving said controlled means to said operative positions; a set of pairs of control members, each control member being formed with projections and recesses, each pair of control members having projections and recesses of the same length and each recess of each control member being aligned with a projection of the other control member of the respective pair, each pair of control members being correlated with different operative positions of said controlled means, and having an inoperative position in which one control member is advanced and the other control member is retracted, and an effective position in which said one control member is retracted and said other control member is advanced; program means operatively connected to said pairs of control members for moving selected pairs to said effective position; and means on said controlled means for sensing projections and recesses of said pairs of control members and controlling the movement of said controlled means according to sensed projections and recesses of pairs of control members in said effective position so that said controlled means stop in selected operative positions under control of said program means.

16. In a business machine, in combination, a motion control arrangement comprising controlled means including a plurality of parallel controlled bars longitudinally movable between a plurality of operative positions; means for moving said controlled means to said operative positions; a set of pairs of control members located in parallel planes transverse to said controlled bars, each control member being formed with projections and recesses, the projections and recesses of each pair of control members extending through different distances and being arranged and constructed in such a manner that a projection or a recesses of each successive pair of control members has the same length as a projection and a recess of the control members of a preceding pair, the number of projections and recesses of the control members of each pair being different, said different numbers being successive powers of two, each pair of control members being correlated with different operative positions of said controlled means, and having an inoperative position in which one control member is advanced and the other control member is retracted, and an effective position in which said one control member is retracted and said other control member is advanced; and program means operatively connected to said pairs of control members for moving selected pairs to said effective position; and teeth on said parallel controlled bars sensing projections and recesses of said pairs of control members to block selected controlled bars and to permit movement of a selected controlled bar to a selected operative position under control of said program means.

17. A motion control arrangement as set forth in claim 16 wherein said controlled bars are spaced from each other corresponding to the columns of a punch card, and have heads serving as punch hammers and adapted to be located between a punch actuator and a punch for punching an extra hole representing a symbol; and wherein said pairs of control members are spaced from each other distances corresponding to lines of the punch card.

18. A motion control arrangement as set forth in claim 17 wherein one of said controlled bars is associated with a punch for marking an extra hole in the card representing a sum; and including an additional control bar having a projection for controlling said one controlled bar and being movable between an inoperative position and a blocking position; and means for shifting said additional control bar between said inoperative and blocking positions.

19. A motion control arrangement as set forth in claim 17 and including an additional control bar movable between an inoperative and a blocking position and cooperating with said controlled bars to block movement of a controlled bar, selected by operation of the other control bars, in the eleventh column of a card or to permit movement of the respective controlled bar to the twelfth column; and means for shifting said additional control bar between said inoperative and blocking positions.

20. In a business machine, in combination, a motion control arrangement comprising a movable bookkeeping carriage adapted to support forms to be printed; controlled means including a card transporting means movable between a plurality of operative positions respectively associated with the columns of a transported card; means for moving said controlled means to said operative positions; a set of control members, each control member being formed with projections and recesses correlated with different operative positions of said controlled means and being movable between an inoperative position and an effective position; program means connected to said bookkeeping carriage for movement therewith and operatively connected to said control members for moving selected control members to said effective position; and means for sensing projections and recesses of control members in said effective position and being operatively connected to said controlled means to control the movement of the same according to sensed projections and recesses so that said controlled means stop in selected positions of said operative positions under control of said program means.

21. In a business machine, in combination, a motion control arrangement comprising a movable bookkeeping carriage adapted to support forms to be printed; controlled means including a plurality of controlled bars movable between a plurality of operative positions and having heads serving as punch hammers and adapted to be located between a punch actuator and a punch to effect punching in each operative position; means for moving said controlled means to said operative positions; a set of pairs of control members, each control member being formed with projections and recesses, each pair of control members being correlated with different operative positions of said controlled means, and having an inoperative position in which one control member is advanced and the other control member is retracted, and an effective position in which said one control member is retracted and said other control member is advanced; program means connected to said bookkeeping carriage for movement therewith and operatively connected to said pairs of control members for moving selected pairs to said effective position; and means on said controlled means for sensing projections and recesses of said pairs of control members and controlling the movement of said controlled means according to sensed projections and recesses of pairs of control members in said effective position so that said controlled means stop in selected operative positions under control of said program means.

References Cited in the file of this patent

UNITED STATES PATENTS

| | | |
|---|---|---|
| 2,229,765 | Bower | Jan. 28, 1941 |
| 2,836,355 | Banik | May 27, 1958 |
| 2,981,467 | Jones | Apr. 25, 1961 |